(12) United States Patent
Shi et al.

(10) Patent No.: US 10,925,072 B2
(45) Date of Patent: Feb. 16, 2021

(54) METHOD FOR INDICATING DOWNLINK CONTROL SIGNALING AND RELATED DEVICE

(71) Applicant: Huawei Technologies Co., Ltd., Guangdong (CN)

(72) Inventors: Hongzhe Shi, Shanghai (CN); Yong Liu, Shanghai (CN); Xiaoyan Bi, Shanghai (CN); Lu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 16/242,941

(22) Filed: Jan. 8, 2019

(65) Prior Publication Data

US 2019/0150159 A1 May 16, 2019

Related U.S. Application Data

(63) Continuation of application No. PCT/CN2017/083599, filed on May 9, 2017.

(30) Foreign Application Priority Data

Jul. 13, 2016 (CN) .......................... 201610550117.6

(51) Int. Cl.
*H04W 72/08* (2009.01)
*H04L 5/00* (2006.01)
(Continued)

(52) U.S. Cl.
CPC ........ *H04W 72/082* (2013.01); *H04B 7/0452* (2013.01); *H04L 5/0026* (2013.01);
(Continued)

(58) Field of Classification Search
None
See application file for complete search history.

(56) References Cited

U.S. PATENT DOCUMENTS

| 2011/0194536 A1* | 8/2011 | Kim ..................... H04L 5/0023 370/335 |
| 2014/0133334 A1* | 5/2014 | Nagata ................. H04B 7/0452 370/252 |

(Continued)

FOREIGN PATENT DOCUMENTS

| CN | 102164372 A | 8/2011 |
| CN | 104852778 A | 8/2015 |

(Continued)

OTHER PUBLICATIONS

Extended European Search Report, dated Apr. 17, 2019, in European Application No. 17826817.3 (8 pp.).

*Primary Examiner* — Brian S Roberts
(74) *Attorney, Agent, or Firm* — Kilpatrick Townsend & Stockton LLP

(57) ABSTRACT

A method for indicating downlink control signaling and a related device are provided. The method includes: generating, by an access network device, indication information, and sending the indication information to a first terminal device by using downlink control signaling, where the indication information is used by the first terminal device to obtain information about an antenna port that is used by a second terminal device and that is corresponding to a demodulation reference signal, and the second terminal device is a terminal device currently performing spatial multiplexing together with the first terminal device. This implements interference detection performed by the first terminal device on a plurality of users.

11 Claims, 4 Drawing Sheets

(51) Int. Cl.
*H04W 72/04* (2009.01)
*H04B 7/0452* (2017.01)

(52) U.S. Cl.
CPC .......... *H04L 5/0051* (2013.01); *H04L 5/0057* (2013.01); *H04W 72/04* (2013.01); *H04W 72/042* (2013.01)

(56) References Cited

U.S. PATENT DOCUMENTS

| | | |
|---|---|---|
| 2015/0263796 A1 | 9/2015 | Nam et al. |
| 2016/0337102 A1 | 11/2016 | Xin et al. |
| 2018/0278391 A1 | 9/2018 | Zhang et al. |

FOREIGN PATENT DOCUMENTS

| | | |
|---|---|---|
| CN | 105792373 A | 7/2016 |
| CN | 106559194 A | 4/2017 |
| CN | 104380640 B | 11/2018 |
| EP | 2648448 A1 | 10/2013 |
| WO | 2012/148207 A2 | 11/2012 |
| WO | 2012148207 A2 | 11/2012 |
| WO | 2013138989 A1 | 9/2013 |

\* cited by examiner

METHOD FOR INDICATING DOWNLINK CONTROL SIGNALING AND RELATED DEVICE

CROSS-REFERENCE TO RELATED APPLICATIONS

This application is a continuation of International Application No. PCT/CN2017/083599 filed on May 9, 2017, which claims priority to Chinese Patent Application No. 201610550117.6 filed on Jul. 13, 2016. The disclosures of the aforementioned applications are hereby incorporated by reference in their entireties.

TECHNICAL FIELD

The present application relates to the field of wireless communications technologies, and in particular, to a method for indicating downlink control signaling and a related device.

BACKGROUND

In the prior art, after assigning a port number for a demodulation reference signal (DMRS) to a terminal device, an access network device delivers, to the terminal device by using downlink control indicator (DCI), an antenna port number assigned to the terminal device. In single-user multiple-input multiple-output (SU-MIMO), the terminal device sends multi-layer data stream, the terminal device may demodulate, by using a demodulation reference signal (DMRS), a data stream obtained after spatial multiplexing is performed, and the terminal device may determine, by using the DMRS port number, time-domain information, frequency-domain information, and code division information, corresponding to a physical resource block, of a data stream corresponding to the DMRS port number. In this case, by using other parameter configurations, the terminal device can perform channel estimation to obtain inter-layer interference information. Based on the interference information obtained by the foregoing measurement, the terminal device may perform interference suppression by using a co-channel interference suppression algorithm.

However, in a scenario of multiple-user multiple-input multiple-output (MU-MIMO), because a terminal device cannot learn of DMRS port configuration information of another terminal device, the terminal device cannot measure interference to itself from the another terminal device, resulting in degraded communication quality of the terminal device due to great interference between a plurality of users.

SUMMARY

The present disclosure provides a method for indicating downlink control signaling and a related device, to resolve a problem that in an existing mechanism, a terminal device cannot detect interference between a plurality of users.

According to a first aspect, a method for indicating downlink control signaling is provided, and the method includes:

generating, by an access network device, indication information, and sending the indication information to a first terminal device by using downlink control signaling, where the indication information is used by the first terminal device to obtain information about an antenna port that is used by a second terminal device and that is corresponding to a demodulation reference signal, and the second terminal device is a terminal device currently performing spatial multiplexing together with the first terminal device. In this way, the first terminal device can obtain, by using the indication information, the information about the antenna port used by the second terminal device, so as to measure interference between a plurality of users.

In some possible designs, an implicit mechanism is designed, that is, a port number configuration rule is preset on both an access network device side and a terminal device side, and indicates a target port number only. In the implicit mechanism, the indication information carries:

a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set further includes another port number whose numerical value is less than or greater than that of the target port number.

The target port number is used by the first terminal device to determine, based on the target port number and the preset port number configuration rule, a total quantity of transport layers called in the current spatial multiplexing, and determine, based on a quantity of transport layers called for the first terminal device, the total quantity of transport layers, and the target port number, a port number that is used by the second terminal device and that is corresponding to the reference signal.

Correspondingly, in the implicit mechanism, before the sending the indication information to a first terminal device by using downlink control signaling, a process of assigning, by the access network device, an antenna port to the first terminal device is as follows:

when assigning antenna port numbers for the demodulation reference signal to the first terminal device and the second terminal device, determining, by the access network device, the total quantity of transport layers called in the current spatial multiplexing, and determining, based on the port number configuration rule and the total quantity of transport layers, a first set of antenna port numbers that are used for the demodulation reference signal and that are assigned to the terminal device performing the spatial multiplexing, where the first antenna port number set includes port numbers whose quantity is equal to the total quantity of transport layers; and selecting, by the access network device, the target port number from the first antenna port number set based on a port number arrangement order and the quantity of transport layers called for the first terminal device.

By using the implicit mechanism, signaling overheads can be further reduced on a basis of ensuring that the first terminal device detects interference between the plurality of users.

In some possible designs, an explicit mechanism is designed, that is, a port number is assigned and indicated according to a conventional port number configuration rule, and a total quantity of transport layers is additionally delivered. In the explicit mechanism, the indication information carries:

a total quantity of transport layers called in the current spatial multiplexing and a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set includes another port number whose numerical value is less than or greater than that of the target port number.

The target port number is used by the first terminal device to determine, based on the target port number, the total quantity of transport layers called in the current spatial multiplexing, and a quantity of transport layers called for the first terminal device, a port number that is used by the second terminal device and that is corresponding to the reference signal.

Correspondingly, in the explicit mechanism, the antenna port number set includes consecutive port numbers, and before the sending the indication information to a first terminal device by using downlink control signaling, a process of assigning, by the access network device, an antenna port to the first terminal device is as follows:

when assigning antenna port numbers for the demodulation reference signal to the first terminal device and the second terminal device, determining, by the access network device, the total quantity of transport layers called in the current spatial multiplexing, and selecting, based on the total quantity of transport layers, a second set of assignable port numbers that are used by the terminal device for the demodulation reference signal, where the second antenna port number set includes port numbers whose quantity is equal to the total quantity of transport layers; and assigning, by the access network device to the first terminal device, consecutive port numbers in the second antenna port number set based on a port number arrangement order and the quantity of transport layers called for the first terminal device.

In addition, in the explicit mechanism, the access network device further needs to send the total quantity of transport layers to the first terminal device by using dynamic signaling, so that the first terminal device can obtain the information about the port number used by the second terminal device.

By using the implicit mechanism, signaling overheads can be further reduced on a basis of ensuring that the first terminal device detects interference between the plurality of users.

In some possible designs, to obtain true communication quality of a current channel and dynamically adjust a coding mode or a downlink rate based on the true communication quality, an enhanced CQI may be used. For example, the access network device may send a notification message to the first terminal device by additionally configuring new signaling, where the notification message is used to instruct the first terminal device to report multi-user channel quality indication information to the access network device.

According to a second aspect, a method for indicating downlink control signaling is provided, and the method includes:

receiving, by a first terminal device, indication information sent by an access network device by using downlink control signaling; and obtaining, by the first terminal device based on the indication information, information about an antenna port that is used by a second terminal device and that is corresponding to a demodulation reference signal, where the second terminal device is a terminal device currently performing spatial multiplexing together with the first terminal device. The first terminal device can perform interference measurement based on the obtained information about the antenna port, to perform interference measurement on the terminal device performing the spatial multiplexing.

In some possible designs, in an implicit design, the indication information carries:

a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set further includes another port number whose numerical value is less than or greater than that of the target port number.

Correspondingly, in the implicit design, a process of obtaining, by the first terminal device, the information about the antenna port used by the second terminal device is as follows:

determining, by the first terminal device based on the target port number and a preset port number configuration rule, a total quantity of transport layers called in the current spatial multiplexing, and determining, based on a quantity of transport layers called for the first terminal device, the total quantity of transport layers, and the target port number, a port number that is used by the second terminal device and that is corresponding to the reference signal.

In some possible designs, in an explicit design, the indication information carries:

a total quantity of transport layers called in the current spatial multiplexing and a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set includes another port number whose numerical value is less than or greater than that of the target port number.

Correspondingly, in the explicit design, a process of obtaining, by the first terminal device, the information about the antenna port used by the second terminal device is as follows:

determining, by the first terminal device based on the target port number, the total quantity of transport layers called in the current spatial multiplexing, and a quantity of transport layers called for the first terminal device, a port number that is used by the second terminal device and that is corresponding to the reference signal.

The total quantity of transport layers is additionally sent by the access network device to the first terminal device by using dynamic signaling.

In a possible design, to obtain a better transmission service, the first terminal device can obtain an enhanced CQI after measuring interference between a plurality of users, and can also report true communication quality of a current channel to the access network device, so that the access network device can dynamically adjust a coding mode or downlink rate based on the true communication quality. A specific process is as follows: After the first terminal device obtains, based on the indication information, the information about the antenna port that is used by the second terminal device and that is corresponding to the demodulation reference signal, if receiving a notification message sent by the access network device, the first terminal device reports multi-user channel quality indication information to the access network device after performing interference measurement based on the information about the antenna port used by the second terminal device.

According to a third aspect of the present disclosure, an access network device is provided, and the access network device has corresponding functions for implementing the method for indicating downlink control signaling provided in the first aspect. The functions may be implemented by using hardware, or may be implemented by executing corresponding software by hardware. The hardware or software includes one or more modules corresponding to the foregoing functions, and the module may be software and/or hardware.

In a possible design, the access network device includes:

a processing module, configured to generate indication information; and a sending module, configured to send, by using downlink control signaling, the indication information generated by the processing module to a first terminal device, where the indication information is used by the first terminal device to obtain information about an antenna port that is used by a second terminal device and that is corresponding to a demodulation reference signal, and the second terminal device is a terminal device currently performing spatial multiplexing together with the first terminal device.

In a possible design, the access network device includes:

at least one processor, a memory, a receiver, and a transmitter, where the memory is configured to store program code, and the processor is configured to invoke the program code in the memory to perform the following operations:

generating indication information; and sending, by using the transmitter and by using downlink control signaling, the indication information generated by the processing module to a first terminal device, where the indication information is used by the first terminal device to obtain information about an antenna port that is used by the second terminal device and that is corresponding to a demodulation reference signal, and the second terminal device is a terminal device currently performing spatial multiplexing together with the first terminal device.

According to a fourth aspect of the present disclosure, a first terminal device is provided, and the first terminal device has corresponding functions for implementing the method for indicating downlink control signaling provided in the second aspect. The functions may be implemented by using hardware, or may be implemented by executing corresponding software by hardware. The hardware or software includes one or more modules corresponding to the foregoing functions, and the module may be software and/or hardware.

In a possible design, the first terminal device includes:

a receiving module, configured to receive indication information sent by an access network device by using downlink control signaling; and a processing module, configured to obtain, based on the indication information received by the receiving module, information about an antenna port that is used by a second terminal device and that is corresponding to a demodulation reference signal, where the second terminal device is a terminal device currently performing spatial multiplexing together with the first terminal device.

In a possible design, the first terminal device includes:

at least one processor, a memory, a receiver, and a transmitter, where the memory is configured to store program code, and the processor is configured to invoke the program code in the memory to perform the following operations:

receiving, by using the receiver, indication information sent by the access network device by using downlink control signaling; and obtaining, based on the indication information received by the receiver, information about an antenna port that is used by the second terminal device and that is corresponding to a demodulation reference signal, where the second terminal device is a terminal device currently performing spatial multiplexing together with the first terminal device.

According to a fifth aspect of the present disclosure, a communications system is provided, and the communications system has corresponding functions for implementing the method for indicating downlink control signaling. The functions may be implemented by using hardware, or may be implemented by executing corresponding software by hardware. The hardware or software includes one or more modules corresponding to the foregoing functions, and the module may be software and/or hardware.

In a possible design, the communications system includes:

the access network device described in the third aspect, and the first terminal device described in the fourth aspect.

Compared with the prior art, in the solutions provided in the present disclosure, the access network device generates a piece of indication information used by the first terminal device to obtain the information about the antenna port that is used by the second terminal device for the demodulation reference signal, so that the first terminal device can perform, based on the obtained information about the antenna port, interference measurement on the second terminal device performing the spatial multiplexing.

DETAILED DESCRIPTION

Figure 1:
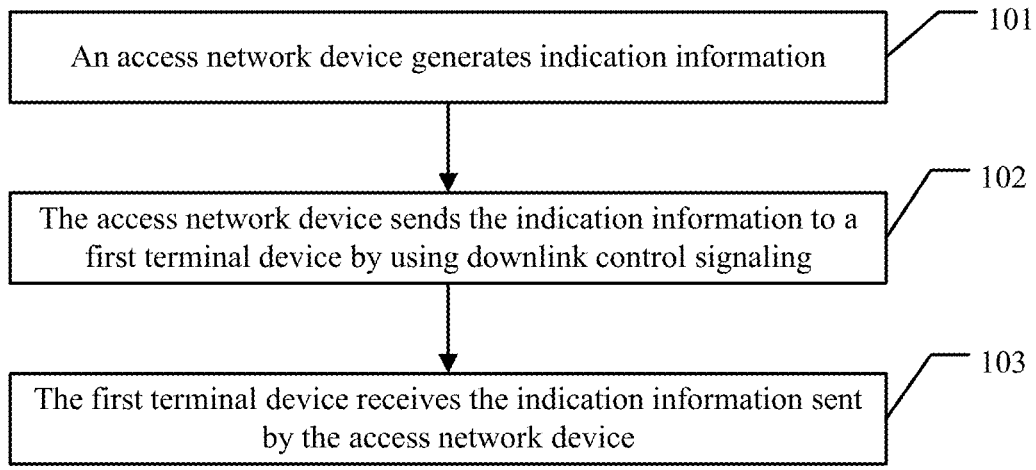
FIG. 1 is a schematic flowchart of a method for indicating downlink control signaling according to an embodiment.

The following clearly and describes technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. In addition, the terms "include", "have", and any variant thereof are intended to cover non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and there may be another division during implementation in actual application. For example, a plurality of modules may be combined or integrated into another system, or some features may be ignored or not be performed. In addition, the displayed or discussed mutual couplings or direct couplings or communication connections may be implemented through some interfaces. The indirect couplings or communication connections between the modules may be implemented in electronic or another form, and this is not limited in this specification. In addition, modules or sub-modules described as separate components may be or may not be physically separated, or may be or may not be physical modules, or may not be grouped into a plurality of circuit modules. Objectives of the solutions of the embodiments of the present disclosure may be achieved by selecting some or all of the modules according to actual requirements.

The embodiments of the present disclosure provide a method for indicating downlink control signaling and a related device, to resolve a problem that in an existing mechanism, a terminal device cannot detect interference between a plurality of users. Details are described below.

The terminal device mentioned in the embodiments of the present disclosure may be a device that provides a user with voice and/or data connectivity, a handheld device with a radio connection function, or another processing device connected to a radio modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a terminal device, a user agent, a user device, or user equipment.

To resolve the foregoing technical problem, the embodiments of the present disclosure mainly provide the following several technical solutions.

Solution 1: After assigning, to terminal devices (including a terminal device A, a terminal device B, and a terminal device C) performing spatial multiplexing, antenna ports for a demodulation reference signal, an access network device delivers, to the terminal device A, information about a port number of an antenna port assigned to the terminal device A together with information about port numbers of antenna ports assigned to the terminal device B and the terminal device C.

Solution 2: A port number configuration rule is preset on both an access network device side and a terminal device side. After assigning, to terminal devices (including a terminal device A, a terminal device B, and a terminal device C) performing spatial multiplexing, antenna ports for a demodulation reference signal, an access network device delivers, to the terminal device A, a starting port number of an antenna port assigned to the terminal device A. The terminal device A calculates, based on the starting port number and the port number configuration rule, port numbers of antenna ports assigned to the terminal device B and the terminal device C. Then, the terminal device A performs channel estimation based on the port numbers assigned to the terminal device B and the terminal device C, to obtain information about interference from the terminal device B and the terminal device C to the terminal device A.

Solution 3: After assigning, to terminal devices (including a terminal device A, a terminal device B, and a terminal device C) performing spatial multiplexing, antenna ports for a demodulation reference signal, an access network device delivers, to the terminal device A, a starting port number of an antenna port assigned to the terminal device A and a total quantity of transport layers called in the spatial multiplexing. The terminal device A calculates, based on the starting port number and a conventional port number configuration rule (for example, based on a port number arrangement order and a consecutive-port-number assignment rule), port numbers of antenna ports assigned to the terminal device B and the terminal device C. Then, the terminal device A performs channel estimation based on the port numbers assigned to the terminal device B and the terminal device C, to obtain information about interference from the terminal device B and the terminal device C to the terminal device A. The port number arrangement order may be an ascending order, or may be a descending order. A specific ordering rule is not limited in this application.

In the foregoing technical solutions, each terminal device performing spatial multiplexing may obtain information about antenna ports used by other terminal devices for a demodulation reference signal, to measure interference from the other terminal devices to the terminal device. In addition, based on Solution 2 and Solution 3, signaling overheads can be further reduced.

It should be noted that in the embodiments of the present disclosure, a first terminal device needs to know only an antenna port number assigned to the first terminal device and an antenna port number assigned to another terminal device performing spatial multiplexing, without knowing which antenna port number is specifically assigned to which terminal device. This is not limited in the embodiments of the present disclosure.

Referring to FIG. 1, the following uses an example to describe a method for indicating downlink control signaling according to the present disclosure. Terminal devices currently performing spatial multiplexing include a first terminal device and a second terminal device. The second terminal device includes at least one terminal device. The following provides description by using an example in which the first terminal device obtains information about an antenna port that is used by the second terminal device and that is corresponding to a demodulation reference signal. When assigning antenna port numbers for a demodulation reference signal to the first terminal device and the second terminal device, an access network device first determines a total quantity of transport layers called in the current spatial multiplexing, and assigns an antenna port for demodulation reference signal to each of the first terminal device and the second terminal device based on the total quantity of transport layers, and then delivers information about the antenna ports to a corresponding terminal device, or delivers information about the antenna port to a terminal device that needs to perform interference measurement. The following describes how the access network device indicates information about an antenna port to a terminal device. An embodiment of the present disclosure includes the following steps.

101: The access network device generates indication information.

The indication information is used by the first terminal device to obtain information about an antenna port that is used by the second terminal device and that is corresponding to a demodulation reference signal.

The access network device may indicate the indication information to the first terminal device by using different mechanisms. Therefore, mechanisms used for assigning an antenna port to a terminal device and content included in the generated indication information are different. There are mainly the following scenarios.

In a first scenario, the access network device incorporates the information about the antenna port used by the second terminal device into the indication information sent to the first terminal device. The indication information includes information about an antenna port used by the first terminal device.

In the first scenario, because the access network device sends the indication information including the information about the antenna port used by the second terminal device and the information about the antenna port used by the first terminal device, a relatively large number of signaling overheads are required. To reduce the signaling overheads, methods described in a second scenario and a third scenario described below may be used.

In the second scenario, an implicit mechanism is designed, that is, a port number configuration rule is preset on both an access network device side and a terminal device side, and indicates a target port number only.

The terminal device may directly obtain, based on a port number indicated by the access network device, a port number assigned to the second terminal device.

When assigning an antenna port to the terminal device, the access network device determines, based on the port number configuration rule and a total quantity of transport layers, a first set of antenna port numbers that are used for the demodulation reference signal and that are assigned to the terminal device performing the spatial multiplexing, and selects the target port number from the first antenna port number set based on a port number arrangement order and a quantity of transport layers called for the first terminal device. The first antenna port number set includes port numbers whose quantity is equal to the total quantity of transport layers, and the antenna port number set includes consecutive port numbers.

The indication information may include a target port number that is used by the first terminal device and that is corresponding to the reference signal. The target port number is a port number, in an antenna port number set, assigned by the access network device to the first terminal device for the demodulation reference signal, and the antenna port number set includes only the target port number, or the antenna port number set further includes another port number whose numerical value is less than or greater than that of the target port number. The port numbers included in the antenna port number set are arranged in the port number arrangement order. They may be arranged in ascending or descending order. This is not specifically limited. In other words, the access network device may indicate, to the first terminal device, a minimum port number or a maximum port number in the set of antenna port numbers assigned to the first terminal device, so that the first terminal device can deduce a port number of an antenna port assigned to the first terminal device. Because the access network device does not need to indicate all assigned port numbers, signaling overheads can be reduced to some extent.

The preset port number configuration rule may be in a form of a mapping table. The mapping table may include a mapping relationship between a port number index range and a total quantity of transport layers called in spatial multiplexing, so that after receiving the target port number, the first terminal device can determine a port number index range to which the target port number belongs, and determine a total quantity of transport layers that is corresponding to the port number index range. Each total transport layer quantity is corresponding to a unique port number index range. The port number index range may include at least one port number, and port numbers included in each port number index range are consecutive numerical values. For example, an upper limit of the total quantity of transport layers is 8. As shown in Table 1 below, port numbers range from #0 to #35, and the 36 port numbers are different from each other. Each item in the total quantity of transport layers (1 to 8) is uniquely corresponding to a port number. For example, when the total quantity of transport layers is 2, a corresponding port number index range is from #1 to #2. When the total quantity of transport layers is 6, a corresponding port number index range is from #15 to #20. This indicates that signaling overheads required for these 36 port numbers are 6 bits (bits).

TABLE 1

| Port number index range | Total quantity of transport layers |
| --- | --- |
| #0 | 1 |
| #1 to #2 | 2 |
| #3 to #5 | 3 |
| #6 to #9 | 4 |
| #10 to #14 | 5 |
| #15 to #20 | 6 |
| #21 to #27 | 7 |
| #28 to #35 | 8 |

In Table 1, that a maximum total quantity of transport layers is 8 is used as an example herein. The port numbers included in the port number index range in the foregoing Table 1 may be selected based on an actual application scenario. The port numbers may be adjusted, for example, a quantity of the port numbers may be increased or decreased, or the port numbers may be rearranged. The port number index range is not limited to being represented by the port numbers, and may also be represented by a formula or another form. This embodiment of the present disclosure is not limited to the mapping relationship shown in Table 1. For example, it is assumed that the maximum total quantity of transport layers is N, and that the port numbers are numbered starting from #0. A maximum port number in the implicit mechanism is calculated as follows:

$$maxPortNumber = \sum_{i=1}^{N} i - 1.$$

For a different actual total quantity of transport layers, that is, i, the port number index range can be represented by the following formula:

$$\begin{cases} 0 & \text{if } i = 1 \\ \left(\sum_{i=1}^{n-1} i, \sum_{i=1}^{n} i - 1\right) & \text{if } i \in (2:N) \end{cases}.$$

The following describes an example: When terminal devices performing spatial multiplexing include a terminal device 1, a terminal device 2, and a terminal device 3, and the total quantity of transport layers is 6, how the access network device assigns port numbers of antenna ports to the terminal device 1 (for which two layers are called), the terminal device 2 (for which three layers are called), and the terminal device 3 (for which one layer is called), and how the access network device indicates information about the port numbers to the terminal device 1, the terminal device 2, and the terminal device 3 by using the indication information. The access network device finds, by querying Table 1, that a port number index range that may be used for assignment this time is from #15 to #20. Based on the port number arrangement order, the access network device assigns a port number #15 and a port number #16 to the terminal device 1, assigns a port number #17, a port number #18, and a port number #19 to the terminal device 2, and assigns a port number #20 to the terminal device 3. It can be learned from FIG. 2, the access network device indicates the port number #15 to the terminal device 1 by using the indication information (a structure for indicating signaling is shown in (a) of FIG. 2), indicates the port number #17 to the terminal device 2 (a structure for indicating signaling is shown in (b) of FIG. 2), and indicates the port number #20 to the terminal device 3 (a structure for indicating signaling is shown in (c) of FIG. 2).

In the third scenario, an explicit mechanism is designed, that is, a port number is assigned and indicated according to a conventional port number configuration rule, and a total quantity of transport layers is additionally delivered.

When assigning an antenna port to the terminal device, the access network device selects, based on a total quantity of transport layers, a second set of assignable port numbers that are used by the terminal device for the demodulation reference signal, assigns consecutive port numbers in the second antenna port number set to the first terminal device based on a port number arrangement order and a quantity of transport layers called for the first terminal device, and sends the total quantity of transport layers to the first terminal device by using dynamic signaling. The second antenna port number set includes port numbers whose quantity is equal to the total quantity of transport layers, and the antenna port number set includes consecutive port numbers.

The indication information may include a total quantity of transport layers called in the current spatial multiplexing and a target port number that is used by the first terminal device and that is corresponding to the reference signal. The target port number is a port number, in an antenna port number set, assigned by the access network device to the first terminal device for the demodulation reference signal, and the antenna port number set includes only the target port number, or the antenna port number set includes another port number whose numerical value is less than or greater than that of the target port number.

In the conventional port number configuration rule, for example, the total quantity of transport layers is 6, and configured port numbers are (#0, #1, #2, #3, #4, and #5). The access network device needs to use 3 bits when indicating the port numbers. A quantity of layers that needs to be called for a user to transmit a data stream ranges from 1 to 6, and therefore signaling required for indicating the total quantity of transport layers also needs 3 bits. Compared with a conventional mechanism, signaling overheads can be reduced by indicating only one port number in the present disclosure.

The following describes an example: When the total quantity of transport layers is 6, how the access network device assigns port numbers of antenna ports to a terminal device 1 (for which two layers are called), a terminal device 2 (for which three layers are called), and a terminal device 3 (for which one layer is called), and how the access network device indicates information about the port numbers to the terminal device 1, the terminal device 2, and the terminal device 3 by using the indication information. Based on the port number arrangement order and a consecutive-port-number assignment rule, the access network device assigns a port number #0 and a port number #1 to the terminal device 1, assigns a port number #2, a port number #3, and a port number #4 to the terminal device 2, and assigns a port number #5 to the terminal device 3. The access network device indicates the port number #0 to the terminal device 1 by using the indication information (a structure for indicating signaling is shown in (a) of FIG. 3), indicates the port number #2 to the terminal device 2 (a structure for indicating signaling is shown in (b) of FIG. 3), and indicates the port number #5 to the terminal device 3 (a structure for indicating signaling is shown in (c) of FIG. 3).

In the second scenario and the third scenario, the port numbers included in the set of assignable antenna port numbers may be consecutive or inconsecutive numerical values. Therefore, the consecutive port numbers in this embodiment of the present disclosure means that locations selected by the access network device from the set of assignable antenna port numbers are consecutive or adjacent. For example, if the set of assignable antenna port numbers is [#0, #1, #5, #6, #7, #8, #10, #11], port numbers (0, #1, and #5) assigned to the terminal device are also considered as consecutively assigned port numbers. In addition, in this embodiment of the present disclosure, only that the total quantity of transport layers is 6 or 8 is used as an example. The total quantity of transport layers may also be other values, and is not limited to the scenarios described in the present disclosure.

102: The access network device sends the indication information to the first terminal device by using downlink control signaling.

A case in which the access network device generates and sends the indication information includes: after assigning the antenna port for the demodulation reference signal to the first terminal device, adding a port number of the antenna port into the indication information, and delivering, to the first terminal device by using user-dedicated control signaling, the indication information carrying the port number, or indicating, to the first terminal device, a port number of the antenna port assigned to the first terminal device, and additionally delivering the indication information to the first terminal device by using downlink control signaling.

103: The first terminal device receives the indication information sent by the access network device.

104: The first terminal device obtains, based on the indication information, information about an antenna port that is used by the second terminal device and that is corresponding to a demodulation reference signal.

Because a mechanism for assigning a port number and a mechanism for indicating the port number are different on an access network device side, mechanisms for obtaining, by the first terminal device, the port number assigned to the second terminal device are correspondingly different. There are mainly the following several scenarios.

1: If a scenario is the first scenario described in the foregoing Step 101.

The first terminal device may determine, based on the target port number and a preset port number configuration rule, a total quantity of transport layers called in current spatial multiplexing, and determine, based on a quantity of transport layers called for the first terminal device, the total quantity of transport layers, and the target port number, a port number that is used by the second terminal device and that is corresponding to the reference signal.

Figure 2:
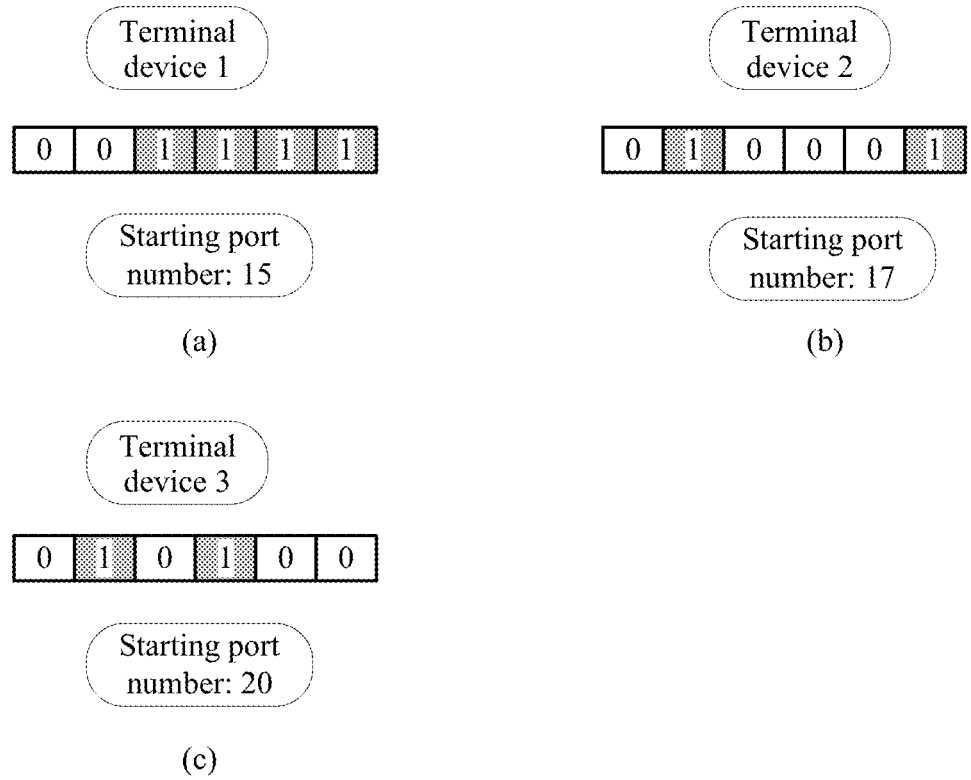
FIG. 2 is a schematic structural diagram of indicating downlink control signaling according to an embodiment.

For example, in an embodiment corresponding to FIG. 2, a port number received by the terminal device 1 is the port number #15, a port number received by the terminal device 2 is the port number #17, and a port number received by the terminal device 3 is the port number #20.

The terminal device 1 may find, by querying based on the preset port number configuration rule (for example, the rule shown in Table 1), that a port number index range to which the port number #15 belongs is from the port number #15 to the port number #20, and finds, by querying based on the mapping relationship shown in Table 1, that the total quantity of transport layers is 6. Two layers are called for the terminal device 1, and therefore it is deduced that the port number #15 and the port number #16 in the port number index range from #15 to #20 are port numbers assigned to the terminal device 1, and the remaining port numbers (#17, #18, #19, and #20) in the port number index range from #15 to #20 are port numbers assigned to the terminal device 2 and the terminal device 3. The terminal device 1 does not need to learn that the remaining port numbers are assigned to which terminal devices, and needs to obtain only port numbers used by other terminal devices (such as the terminal device 2 and the terminal device 3) performing spatial multiplexing together with the terminal device 1. In this case, the terminal device 1 can perform interference measurement by using the port numbers (#17, #18, #19, and #20).

Similarly, the terminal device 2 may obtain port numbers (#17, #18, and #19) assigned to a data stream at three called layers, obtain the remaining port numbers (#15, #16, and #20), and perform interference measurement. The terminal device 3 may obtain a port number (#20) assigned to a data stream at one called layer, obtain the remaining port numbers (#15, #16, #17, #18, and #19), and perform interference measurement.

2: If a scenario is the second scenario described in the foregoing Step 101.

The first terminal device may determine, based on the target port number, a total quantity of transport layers called in current spatial multiplexing, and a quantity of transport layers called for the first terminal device, a port number that is used by the second terminal device and that is corresponding to the reference signal.

Figure 3:
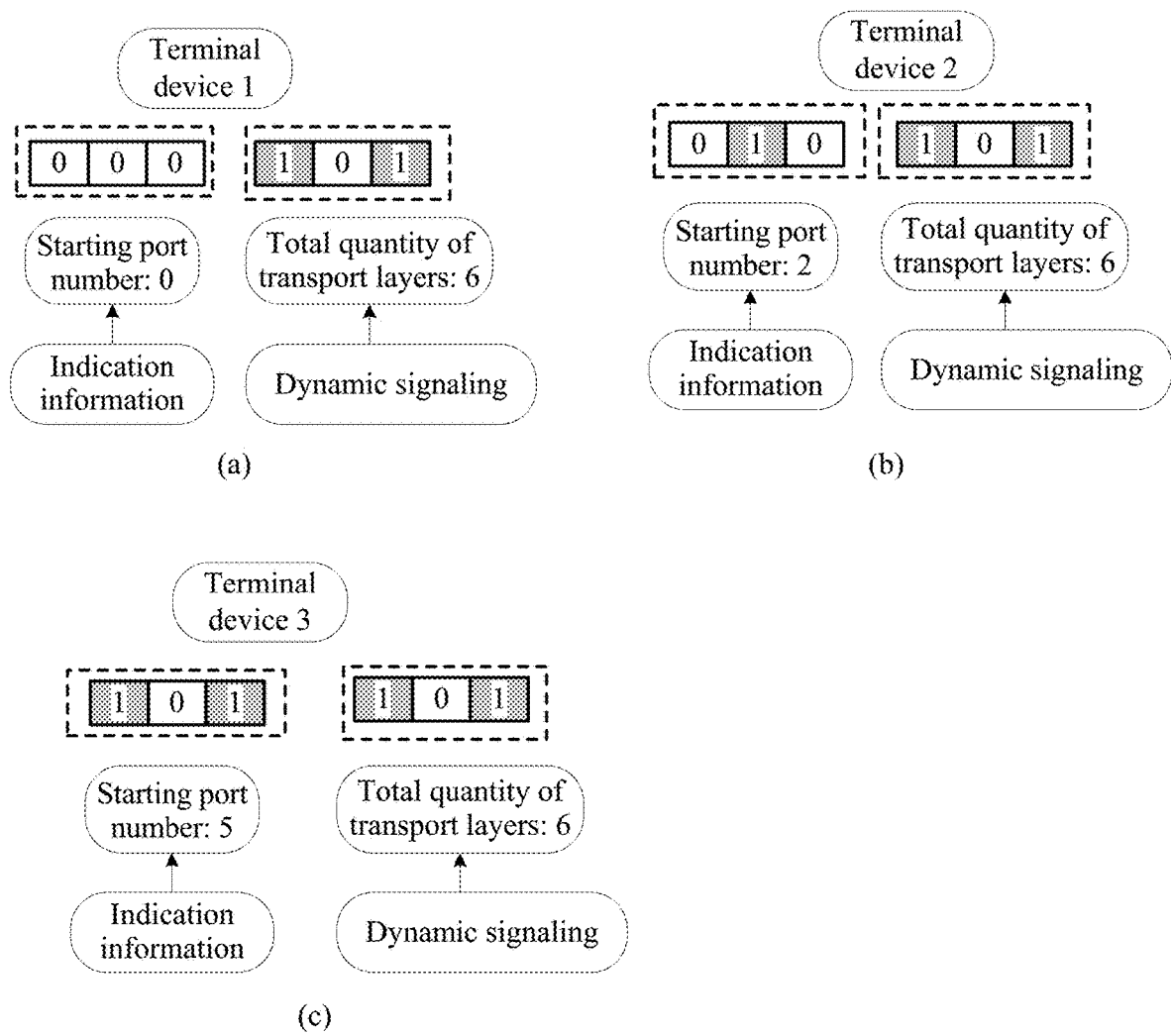
FIG. 3 is another schematic diagram of indicating downlink control signaling according to an embodiment.

For example, in an embodiment corresponding to FIG. 3, a port number received by the terminal device 1 is the port number #0, a port number received by the terminal device 2 is the port number #2, and a port number received by the terminal device 3 is the port number #5.

The terminal device 1 may deduce, based on a conventional port number configuration rule (such as an ascending order and a consecutive-port-number assignment rule), a received total quantity of transport layers that is being 6, and a received quantity of transport layers called for the terminal device 1 that is being 2, that a port number index range corresponding to the total quantity of six transport layers that is being 6 is (#0, #1, #2, #3, #4, and #5). Therefore, it is deduced that the port number #0 and the port number #1 are port numbers assigned to the terminal device 1, and the remaining port numbers (#2, #3, #4, and #5) are port numbers assigned to the terminal device 2 and the terminal device 3. The terminal device 1 still does not need to learn that the remaining port numbers are assigned to which terminal devices, and needs to obtain only port numbers used by other terminal devices (such as the terminal device 2 and the terminal device 3) performing spatial multiplexing together with the terminal device 1. In this case, the terminal device 1 can perform interference measurement by using the port numbers (#2, #3, #4, and #5).

Similarly, the terminal device 2 may obtain port numbers (#2, #3, and #4) assigned to a data stream at three called layers, obtain the remaining port numbers (#0, #1, and #5), and perform interference measurement. The terminal device 3 may obtain a port number (#5) assigned to a data stream at one called layer, obtain the remaining port numbers (#0, #1, #2, #3, and #4), and perform interference measurement.

Optionally, after obtaining multi-user interference information by performing interference measurement, when calculating a channel quality indicator (CQI) of a channel, the first terminal device may calculate an enhanced multiple-user channel quality indicator (Mu-CQI). After sending the indication information to the first terminal device by using the downlink control signaling, the access network device may further send a notification message to the first terminal device by using newly configured signaling, to instruct the first terminal device to report the Mu-CQI to the access network device, so that the access network device can obtain true communication quality of the current channel, to adjust a coding mode or a downlink rate and provide a better transmission service for the terminal devices.

In this embodiment of the present disclosure, after assigning the port number to the first terminal device, the access network device needs to only instruct, by using the indication information, the first terminal device to obtain the information about the antenna port that is used by the second terminal device and that is corresponding to the demodulation reference signal, and can perform, based on the obtained information about the antenna port, interference measurement on the terminal device performing the spatial multiplexing.

The foregoing describes the method for indicating downlink control signaling in the present disclosure. The following describes an access network device and a first terminal device that perform the method for indicating downlink control signaling.

Figure 4:
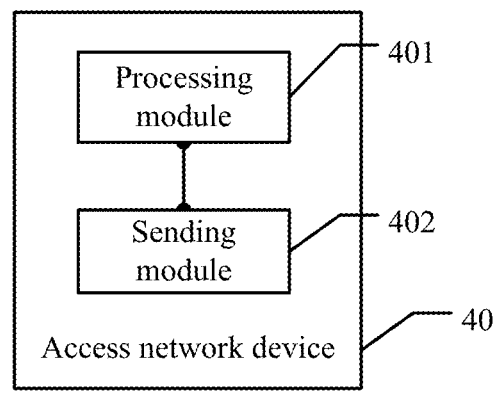
FIG. 4 is a schematic structural diagram of an access network device according to an embodiment.

I: Referring to FIG. 4, an access network device 40 is described. The access network device 40 includes:

a processing module 401, configured to generate indication information; and a sending module 402, configured to send, by using downlink control signaling, the indication information generated by the processing module 401 to a first terminal device, where the indication information is used by the first terminal device to obtain information about an antenna port that is used by a second terminal device and that is corresponding to a demodulation reference signal, and the second terminal device is a terminal device currently performing spatial multiplexing together with the first terminal device.

In this embodiment of the present disclosure, after assigning a port number to the first terminal device, the processing module 401 needs to only send the indication information to the first terminal device by using the sending module, so that the terminal device obtains the information about the antenna port that is used by the second terminal device and that is corresponding to the demodulation reference signal, and can perform interference measurement based on the obtained information about the antenna port, to perform interference measurement on the terminal device performing the spatial multiplexing.

Optionally, in some embodiments of the present disclosure, in an implicit mechanism, the indication information carries:

a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set further includes another port number whose numerical value is less than or greater than that of the target port number.

The target port number is used by the first terminal device to determine, based on the target port number and a preset port number configuration rule, a total quantity of transport layers called in the current spatial multiplexing, and determine, based on a quantity of transport layers called for the first terminal device, the total quantity of transport layers, and the target port number, a port number that is used by the second terminal device and that is corresponding to the reference signal.

Optionally, in the implicit mechanism, before the sending module sends the indication information to the first terminal device by using the downlink control signaling, the processing module 401 is further configured to:

when assigning antenna port numbers for the demodulation reference signal to the first terminal device and the second terminal device, determine the total quantity of transport layers called in the current spatial multiplexing, and determine, based on the port number configuration rule and the total quantity of transport layers, a first set of antenna port numbers that are used for the demodulation reference signal and that are assigned to the terminal device performing the spatial multiplexing, where the first antenna port number set includes port numbers whose quantity is equal to the total quantity of transport layers; and select the target port number from the first antenna port number set based on a port number arrangement order and the quantity of transport layers called for the first terminal device.

Optionally, in some embodiments of the present disclosure, in an explicit mechanism, the indication information carries:

a total quantity of transport layers called in the current spatial multiplexing and a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set includes another port number whose numerical value is less than or greater than that of the target port number.

The target port number is used by the first terminal device to determine, based on the target port number, the total quantity of transport layers called in the current spatial multiplexing, and a quantity of transport layers called for the first terminal device, a port number that is used by the second terminal device and that is corresponding to the reference signal.

Optionally, in the explicit mechanism, the antenna port number set includes consecutive port numbers, and before the sending module 402 sends the indication information to the first terminal device by using the downlink control signaling, the processing module 401 is further configured to:

when assigning antenna port numbers for the demodulation reference signal to the first terminal device and the second terminal device, determine the total quantity of transport layers called in the current spatial multiplexing, and select, based on the total quantity of transport layers, a second set of assignable port numbers that are used by the terminal device for the demodulation reference signal, where the second antenna port number set includes port numbers whose quantity is equal to the total quantity of transport layers; and assign, to the first terminal device, consecutive port numbers in the second antenna port number set based on a port number arrangement order and the quantity of transport layers called for the first terminal device.

The total quantity of transport layers is sent to the first terminal device by the processing module 401 by using the sending module 402 and by using dynamic signaling.

Optionally, in some embodiments of the present disclosure, after the sending module 402 sends the indication information to the first terminal device by using the downlink control signaling, the processing module 401 is further configured to:

send a notification message to the first terminal device by using the sending module 402, where the notification message is used to instruct the first terminal device to report multi-user channel quality indication information to the access network device.

Figure 5:
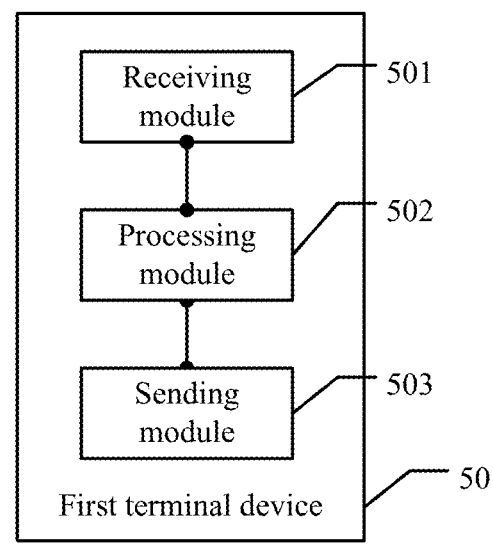
FIG. 5 is a schematic structural diagram of a first terminal device according to an embodiment.

II: Referring to FIG. 5, a first terminal device 50 is described, and the first terminal device 50 includes:

a receiving module 501, configured to receive indication information sent by an access network device by using downlink control signaling; and a processing module 502, configured to obtain, based on the indication information received by the receiving module 501, information about an antenna port that is used by a second terminal device and that is corresponding to a demodulation reference signal, where the second terminal device is a terminal device currently performing spatial multiplexing together with the first terminal device.

In this embodiment of the present disclosure, after the receiving module 501 receives the indication information sent by the access network device, the processing module 401 obtains the information about the antenna port that is used by the second terminal device and that is corresponding to the demodulation reference signal, and can perform interference measurement based on the obtained information about the antenna port, to perform interference measurement on the terminal device performing the spatial multiplexing.

Optionally, in some embodiments of the present disclosure, in an implicit mechanism, the indication information carries:

a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set further includes another port number whose numerical value is less than or greater than that of the target port number.

The processing module 502 is specifically configured to:

determine, based on the target port number and a preset port number configuration rule, a total quantity of transport layers called in the current spatial multiplexing, and determine, based on a quantity of transport layers called for the first terminal device, the total quantity of transport layers, and the target port number, a port number that is used by the second terminal device and that is corresponding to the reference signal.

Optionally, in some embodiments of the present disclosure, in an implicit mechanism, the indication information carries:

a total quantity of transport layers called in the current spatial multiplexing and a target port number that is used by the first terminal device and that is corresponding to the reference signal, where the target port number is a port number, in an antenna port number set, assigned by the access network device to the first terminal device for the demodulation reference signal, and the antenna port number set includes only the target port number, or the antenna port number set includes another port number whose numerical value is less than or greater than that of the target port number.

The processing module 502 is specifically configured to:

determine, based on the target port number, the total quantity of transport layers called in the current spatial multiplexing, and a quantity of transport layers called for the first terminal device, a port number that is used by the second terminal device and that is corresponding to the reference signal.

The total quantity of transport layers sent by the access network device by using dynamic signaling is received by using the receiving module.

Optionally, in some embodiments of the present disclosure, the first terminal device further includes a sending module 503. After obtaining, based on the indication information, the information about the antenna port that is used by the second terminal device and that is corresponding to the demodulation reference signal, the processing module 502 is further configured to:

after receiving, by using the receiving module 501, a notification message sent by the access network device, report multi-user channel quality indication information to the access network device by using the sending module 503.

Figure 6:
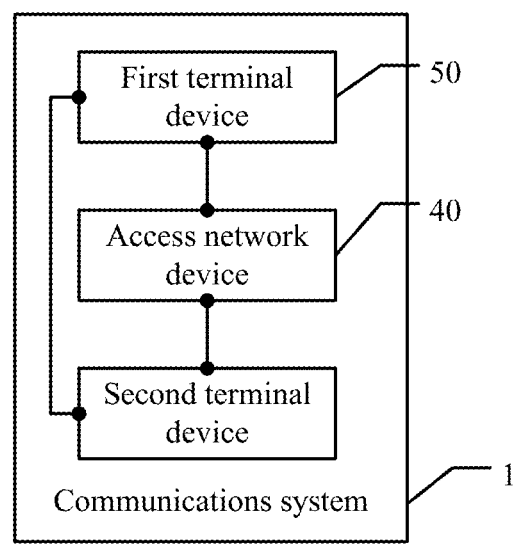
FIG. 6 is a schematic structural diagram of a communications system according to an embodiment.

III. An embodiment of the present disclosure further provides a communications system. Referring to FIG. 6, the communications system 1 includes:

the access network device 40 described in FIG. 4; and the first terminal device described in FIG. 5.

Figure 7:
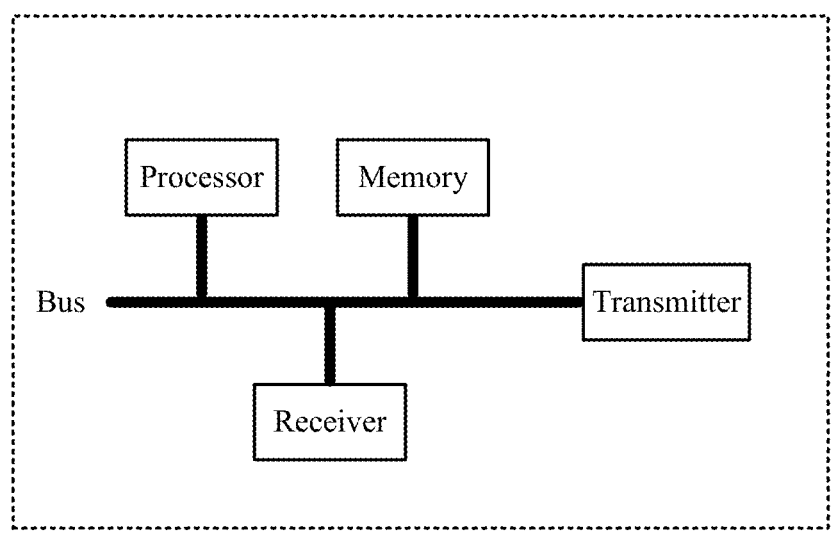
FIG. 7 is a schematic structural diagram of a physical apparatus performing a method for indicating downlink control signaling according to an embodiment.

It should be noted that, in the embodiments of the present disclosure (including the embodiments shown in FIG. 4 and FIG. 5), all physical devices corresponding to the receiving module may be receivers, all physical devices corresponding to the sending modules may be transmitters, and all physical devices corresponding to the processing modules may be processors. Each of the apparatuses shown in FIG. 4 and FIG. 5 may have a structure shown in FIG. 7. When one of the apparatuses has the structure shown in FIG. 7, a processor, a transmitter, and a receiver in FIG. 7 implement functions the same as or similar to functions of the processing module, the sending module, and the receiving module provided in the foregoing apparatus embodiments corresponding to the apparatuses, and a memory in FIG. 7 stores program code required to be invoked by the processor when processor executes the method for indicating downlink control signaling.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not be performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The technical solutions provided in the embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A method for indicating downlink control signaling, the method comprising:
generating, by an access network device, indication information, wherein the indication information indicates the following:
a target port number used by the first terminal device and corresponding to a demodulation reference signal, wherein the target port number is a port number, in an antenna port number set, assigned by the access network device to the first terminal device for the demodulation reference signal, and the antenna port number set comprises only the target port number, or the antenna port number set further comprises another port number whose numerical value is less than or greater than that of the first alternative target port number, or
a total quantity of transport layers called in a current spatial multiplexing and the target port number used by the first terminal device and corresponding to the reference signal, wherein the target port number is the port number, in the antenna port number set, assigned by the access network device to the first terminal device for the demodulation reference signal, and the antenna port number set comprises only the target port number, or the antenna port number set further comprises the another port number whose numerical value is less than or greater than that of the target port number;
sending, by the access network device by using downlink control signaling, the indication information to a first terminal device to enable the first terminal device; and
obtaining information about an antenna port of a second terminal device and that corresponds to a demodulation reference signal, wherein the second terminal device is a terminal device currently performing spatial multiplexing together with the first terminal device, and wherein obtaining the information by the first terminal about the antenna port of a second terminal device comprises:
determining, by the first terminal device based on the target port number and a preset port number configuration rule, the total quantity of transport layers called in the current spatial multiplexing, and determining, based on a quantity of transport layers called for the first terminal device, the total quantity of transport layers, and the target port number, a port number that is used by the second terminal device and that is corresponding to the reference signal; or
determining, based on the quantity of transport layers called for the first terminal device, the total quantity of transport layers, and the target port number, the port number that is used by the second terminal device and that is corresponding to the reference signal.

2. The method according to claim 1, wherein before sending, by the network access device by using downlink control signaling, the indication information, the method further comprises:
determining, by the access network device, the total quantity of transport layers called in the current spatial multiplexing, and determining, based on the port number configuration rule and the total quantity of transport layers, a first set of antenna port numbers to be used for the demodulation reference signal and that are assigned to the first terminal device and the second terminal device performing the spatial multiplexing, wherein the first antenna port number set comprises port numbers whose quantity is equal to the total quantity of transport layers; and
selecting, by the access network device, the target port number from the first antenna port number set based on a port number arrangement order and the quantity of transport layers called for the first terminal device.

3. The method according to claim 1, wherein:
the antenna port number set comprises consecutive port numbers; and
before sending, by the network device by using downlink control signaling, the indication information, the method further comprises:
determining, by the access network device, the total quantity of transport layers called in the current spatial multiplexing,
selecting, based on the total quantity of transport layers, a second set of assignable port numbers for use by the terminal device for the demodulation reference signal, wherein the second antenna port number set comprises port numbers whose quantity is equal to the total quantity of transport layers; and
assigning, by the access network device to the first terminal device, consecutive port numbers in the second antenna port number set based on a port number arrangement order and the quantity of transport layers called for the first terminal device.

4. The method according to claim 1, further comprising:
sending, by the access network device, the total quantity of transport layers to the first terminal device by using dynamic signaling.

5. The method according to claim 1, wherein after sending the indication information to a first terminal device by using downlink control signaling, the method further comprises:
sending, by the access network device, a notification message to the first terminal device for instructing the first terminal device to report multi-user channel quality indication information to the access network device.

6. A method for indicating downlink control signaling, the method comprising:
receiving, by a first terminal device, indication information sent by an access network device by using downlink control signaling, wherein the indication information indicates the following:
a target port number used by the first terminal device and corresponding to a demodulation reference signal, wherein the target port number is a port number, in an antenna port number set, assigned by the access network device to the first terminal device for the demodulation reference signal, and the antenna port number set comprises only the target port number, or the antenna port number set further comprises another port number whose numerical value is less than or greater than that of the first alternative target port number, or
a total quantity of transport layers called in a current spatial multiplexing and the target port number used by the first terminal device and corresponding to the reference signal, wherein the target port number is the port number, in the antenna port number set, assigned by the access network device to the first terminal device for the demodulation reference signal, and the antenna port number set comprises only the target port number, or the antenna port number set further comprises the another port number whose numerical value is less than or greater than that of the target port number; and obtaining, by the first terminal device based on the indication information, information about an antenna port of a second terminal device and that corresponds to a demodulation reference signal, wherein the first terminal device is currently performing spatial multiplexing together with the second terminal device, wherein obtaining the information by the first terminal about the antenna port of a second terminal device comprises:

determining, by the first terminal device based on the target port number and a preset port number configuration rule, the total quantity of transport layers called in the current spatial multiplexing, and determining, based on a quantity of transport layers called for the first terminal device, the total quantity of transport layers, and the target port number, a port number that is used by the second terminal device and that is corresponding to the reference signal; or determining, based on the quantity of transport layers called for the first terminal device, the total quantity of transport layers, and the target port number, the port number that is used by the second terminal device and that is corresponding to the reference signal.

7. The method according to claim 6, wherein before obtaining, by the first terminal device based on the indication information, information about an antenna port of a second terminal device and that corresponds to a demodulation reference signal, the method further comprises:

receiving, by the first terminal device, the total quantity of transport layers sent by the access network device by using dynamic signaling.

8. The method according to claim 6, wherein after obtaining, by the first terminal device based on the indication information, information about an antenna port of a second terminal device and that corresponds to a demodulation reference signal, the method further comprises:

after receiving a notification message sent by the access network device, reporting, by the first terminal device, multi-user channel quality indication information to the access network device.

9. A first terminal device, comprising:

a receiver configured to receive indication information sent by an access network device by using downlink control signaling, wherein the indication information indicates the following:

a target port number used by the first terminal device and corresponding to a demodulation reference signal, wherein the target port number is a port number, in an antenna port number set, assigned by the access network device to the first terminal device for the demodulation reference signal, and the antenna port number set comprises only the target port number, or the antenna port number set further comprises another port number whose numerical value is less than or greater than that of the first alternative target port number, or a total quantity of transport layers called in a current spatial multiplexing and the target port number used by the first terminal device and corresponding to the reference signal, wherein the target port number is the port number, in the antenna port number set, assigned by the access network device to the first terminal device for the demodulation reference signal, and the antenna port number set comprises only the target port number, or the antenna port number set further comprises the another port number whose numerical value is less than or greater than that of the target port number; and a processor configured to obtain, based on the indication information received by the receiver, information about an antenna port of a second terminal device and that corresponds to a demodulation reference signal, wherein the first terminal device is currently performing spatial multiplexing together with the second terminal device, wherein obtaining the information about the antenna port of a second terminal device comprises:

determining, by the first terminal device based on the target port number and a preset port number configuration rule, the total quantity of transport layers called in the current spatial multiplexing, and determining, based on a quantity of transport layers called for the first terminal device, the total quantity of transport layers, and the target port number, a port number that is used by the second terminal device and that is corresponding to the reference signal; or determining, based on the quantity of transport layers called for the first terminal device, the total quantity of transport layers, and the target port number, the port number that is used by the second terminal device and that is corresponding to the reference signal.

10. The first terminal device according to claim 9, wherein before obtaining, based on the indication information, the information about the antenna port of the second terminal device and that corresponds to the demodulation reference signal, the processor is further configured to:

receive, by using the receiver, the total quantity of transport layers sent by the access network device by using dynamic signaling.

11. The first terminal device according to claim 9, wherein:

the first terminal device further comprises a transmitter; and after obtaining, based on the indication information, the information about the antenna port of the second terminal device and that corresponds to the demodulation reference signal, the processor is further configured to:

after receiving, by using the receiver, a notification message sent by the access network device, report multi-user channel quality indication information to the access network device by using the transmitter.

* * * * *